United States Patent [19]

Homer

[11] Patent Number: 4,560,842
[45] Date of Patent: Dec. 24, 1985

[54] TELECOMMUNICATION SYSTEM LOOP-BACK UNIT

[75] Inventor: Joseph A. Homer, Manchester, England

[73] Assignee: The General Electric Company, p.l.c., England

[21] Appl. No.: 481,843

[22] Filed: Apr. 4, 1983

[30] Foreign Application Priority Data

Apr. 5, 1982 [GB] United Kingdom ............... 8210034

[51] Int. Cl.⁴ ............................................. H04B 3/46
[52] U.S. Cl. ............................ 179/81 R; 179/175.3 R
[58] Field of Search ............... 179/81 R, 84 R, 84 A, 179/175.3 R, 175.3 F, 175

[56] References Cited

U.S. PATENT DOCUMENTS 3,843,848 10/1974 Cox .............................. 179/175.3 R
3,912,882 10/1975 Beerbaum ..................... 179/175.3 R Primary Examiner—James L. Dwyer
Attorney, Agent, or Firm—Kirschstein, Kirschstein, Ottinger & Israel

[57] ABSTRACT

A loop-back unit for connection at the subscriber's end of a line (15) to provide a loop-back line testing facility, the unit comprising a transformer (1) with a first winding (3) and second winding (5) of relatively high inductance, connected in series across the line, and a third winding (7). In normal operation the subscriber's unit (17) is connected across the second winding and the transformer is transparent to signals on the line. To test the line a tone is applied to the line which is detected by a detector (25) connected across the third winding and in response to the detector output a control circuit (23) operates a switching arrangement (21) to disconnect the subscriber's equipment temporarily from the second winding and apply a test tone across the second winding. The unit is capable of satisfactory operation despite faults in the subscriber's equipment.

6 Claims, 3 Drawing Figures

TELECOMMUNICATION SYSTEM LOOP-BACK UNIT

FIELD OF INVENTION

This invention relates to telecommunication systems.

DESCRIPTION OF PRIOR ART

In telecommunication systems, e.g. telephone systems, there is sometimes provided a loop-back facility whereby a subscriber's line can be checked from an exchange or other monitoring location. To this end a loop-back unit is provided at the subscriber's end of the line which may be activated by a predetermined signal transmitted along the line from the monitoring location. In response to this signal the unit disconnects the subscriber's equipment, and after a suitable delay transmits for a given period a further predetermined signal back down the line to the monitoring location, and then reconnects the subscriber's equipment.

In this way the integrity and transmission characteristics of the line may be tested without sending an engineer to the subscriber's premises.

It is an object of the present invention to provide a loop-back unit which is capable of satisfactory operation despite faults in the subscriber's equipment.

SUMMARY OF INVENTION

According to the present invention a loop-back unit for connection at the subscriber's end of a line of a telecommunication system to provide a loop-back facility comprises: a transformer having first, second and third windings, the first and second windings being connected in series in the same sense, between a first pair of terminals for connection to the line and the first winding having a relatively low inductance compared with the second winding; signal detection means connected across the third winding; switching means whereby said second winding may be connected to or disconnected from a second pair of terminals for connection to a subscriber's equipment; and control means responsive to detection of a signal by said detection means to operate the switching means to disconnect the second pair of terminals from the second winding temporarily and apply a predetermined signal to the subscriber's line whilst the subscriber's equipment is so disconnected.

Preferably the relation between the inductances of the first and second windings is such that, in normal operation, in response to a signal applied to said first terminals, the first and second windings produce substantially equal magnetic fluxes in the third winding in operation.

Where the unit is intended for use with a balanced subscriber's line, the first winding may be replaced by two equal windings disposed one on either side of the second winding.

Two loop-back units in accordance with the invention for use in a telephone system will now be described, by way of example, with reference to the accompanying drawings in which:

DESCRIPTION OF PREFERRED EMBODIMENTS

Figure 1:
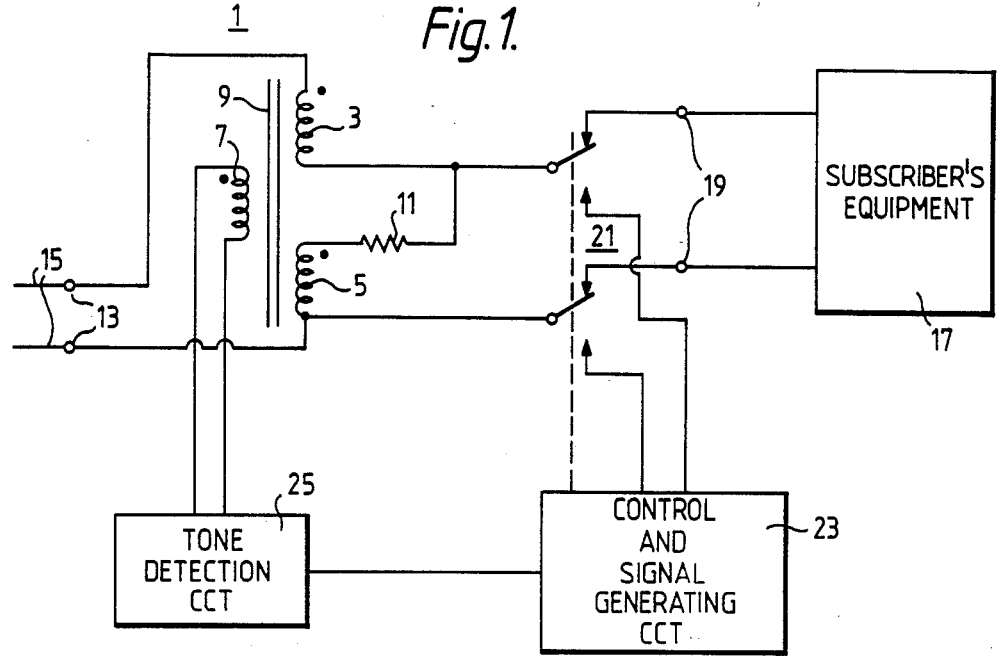
FIG. 1 is a schematic diagram of the first unit.

Referring to FIG. 1, the unit includes a signal detection transformer 1 having first, second and third windings 3, 5 and 7 wound on a ferromagnetic core 9. The first and second windings and a high-valued resistor 11 are connected in series, in the same winding sense, between a pair of terminals 13 of the unit to which are respectively connected the wires of a two-wire line 15 by way of which a subscriber's equipment 17 associated with the unit communicates with the local telephone exchange (not shown).

The subscriber's equipment 17 is connectable via a pair of terminals 19 across the second winding 5 and the resistor 11 via contacts of a relay switching arrangement 21. As further described below, the switching arrangement 21 is operable to disconnect the winding 5 and resistor 11 from the terminals 19, and hence from the subscriber's equipment 17, and connect them instead to control and signal generator circuits 23.

The third winding 7 is connected with a tone detection circuit 25 whose output is utilised by the circuits 23, as described below.

The subscriber's equipment and the exchange line present the same nominal impedance, typically 600 ohms to the unit whilst the windings 3 and 5 have respectively a relatively low and a relatively high inductance.

In normal operation of the unit, i.e. whilst the unit is not being used to test the exchange line, the subscriber's equipment 17 is connected across the winding 5 and resistor 11, as shown in FIG. 1, the winding 3 presenting a low series impedance and the winding 5 together with resistor 11 presenting a high shunt impedance to signals passing between the subscriber's equipment 17 and the exchange. Thus the transformer 1 is virtually 'transparent' to such signals.

Testing the line 15 is initiated by the transmission down the line 15 from the exchange of an audio tone. The resulting currents in the windings 3 and 5 produce substantially equal magnetic fluxes in the transformer core 9 which add together to induce an output signal across the winding 7. The circuit 25 detects this signal and produces an output which activates the circuits 23 to operate the switching arrangement 21, thereby to disconnect the subscriber's equipment 17 from the winding 5 and resistor 11 and to connect instead the signal generator in the circuits 23 across the winding 5 and resistor 11. The signal generator is then activated to generate an audio tone at a predetermined level for a short period, typically one minute, which tone is transmitted along the line 15 to the exchange where it can be utilised to check the integrity and transmission characteristics of the line 15.

At the end of the tone the circuits 23 reoperate the switching arrangement 21 to re-connect the subscriber's equipment 17 across the winding 5 and resistor 11.

It will be appreciated that the winding 7 serves to isolate the detection circuit 25 from the line 15 and may be designed to match the tone transmitted from the exchange to the detection circuit.

The unit will continue to operate satisfactorily even when the subscriber's equipment 17 does not present the correct impedance to the unit, e.g. when the equipment 17 becomes disconnected or presents a short circuit.

Considering the first case, where the subscriber's equipment 17 is disconnected so that a relatively small current flows through the winding 3. Substantially the full open circuit voltage then appears across the winding 5 and resistor 11 with a resultant greater contribution to the flux in transformer core 9 by the winding 5 which compensates for the reduced flux due to winding 3.

In the case where the subscriber's equipment 17 presents a short circuit a similar situation exists in that the winding 5 now produces no flux in the transformer core 9. However, the total impedance of the line 5 and subscriber's equipment 17 is now halved so that the current in winding 3 is twice the normal current, thus compensating for the loss of flux from winding 5.

The resistor 11 serves to buffer the winding 5 from the short circuit presented by the subscriber's equipment 17, thus allowing a signal of satisfactorily high level to appear across winding 7. It will be appreciated that in the absence of resistor 11 the short circuited winding 5 would effectively also present a short circuit across the winding 7 with consequent low output across the winding 7. However, in some circumstances, e.g. where the winding 5 is itself of sufficiently high resistance, it may be possible to dispense with resistor 11.

A further feature of the unit is that signals originating in the subscriber's equipment 17 energize the windings 3 and 5 in such senses that the flux produced in transformer core 9 by winding 5 opposes the flux produced by winding 3 with resulting very small induced voltage across winding 7.

This property can be used to optimise the balance between windings 3 and 5. With a test signal injected at the subscriber's equipment 17 the value of resistor 11 can be adjusted to produce a minimum signal across winding 7. With the value of resistor 11 so adjusted a minimal change in output signal occurs across the winding 7 with variation of the impedance presented to the unit by the subscriber's equipment 17.

In one arrangement which has been used the inductances of windings 3 and 5 are 300 microhenries and 10 henries respectively, and the core 9 consists of high permeability ferrite material. Where there is a direct voltage on the line 15 the core material must be selected to avoid magnetic saturation.

Figure 2:
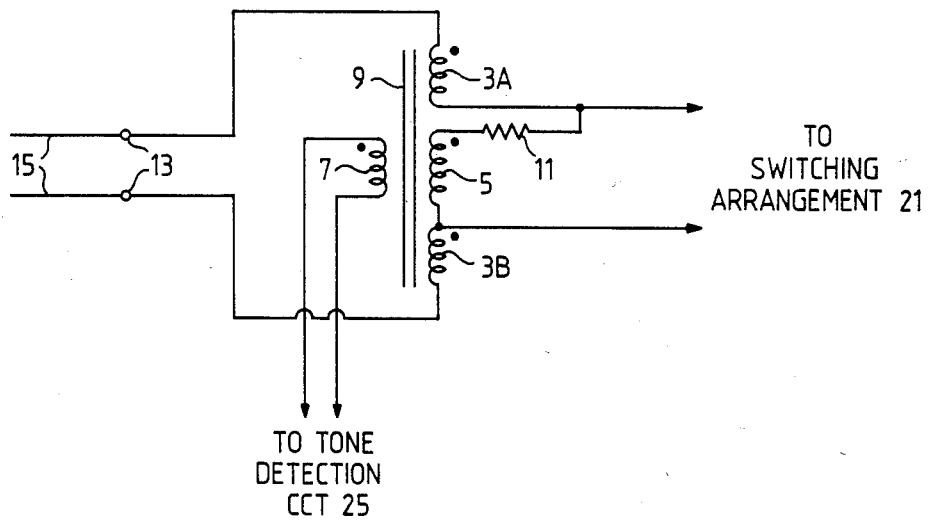
FIG. 2 illustrates a modification of the unit of FIG. 1.

In a modification of the unit of FIG. 1 for use where the line 15 is a balanced line, the winding 3 is replaced by two equal windings 3A and 3B with the winding 7 and the associated resistor 11, if present, connected between the two windings 3A and 3B, as shown in FIG. 2.

Whilst the loop-back unit described above by way of example is for use with a two wire exchange line, it will be appreciated that other units in accordance with the invention may be adapted for use with lines having more than two wires, in particular four wires. In the four wire case the unit will normally be adapted to receive a signal from the exchange over one pair of the four wires and transmit a signal to the exchange over the other pair of the four wires.

Figure 3:
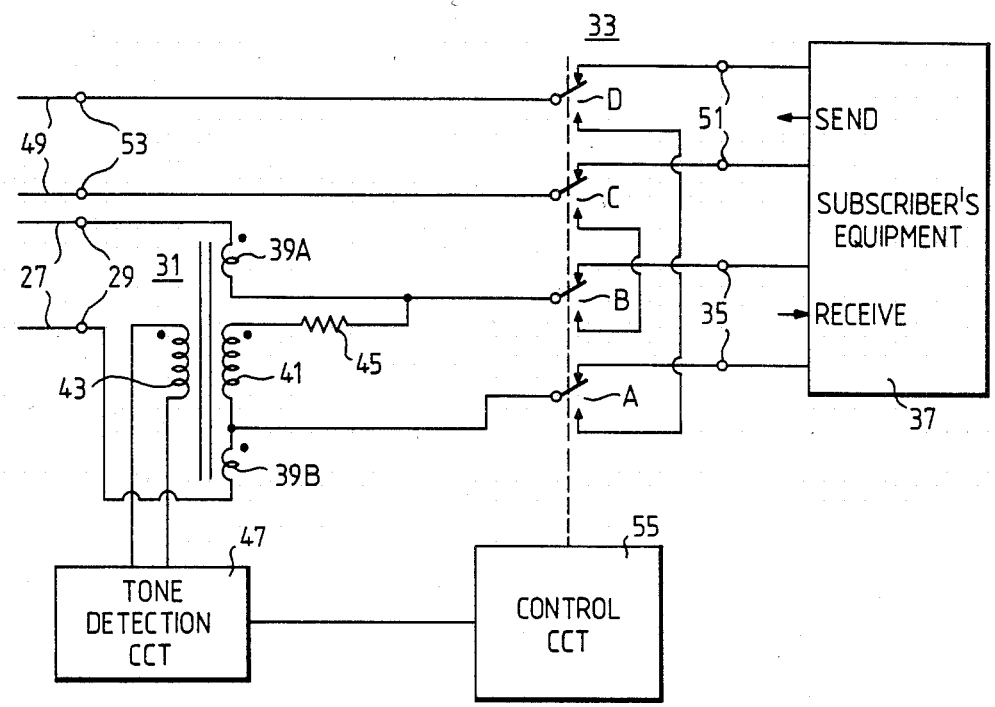
FIG. 3 is a schematic diagram of the second unit.

Referring now to FIG. 3, in one such loop-back unit in accordance with the invention for use with a four-wire exchange line, one pair 27 of wires of the exchange line is connected via a pair of terminals 29, a transformer 31 and two poles A, B of a switching arrangement 33 to a pair of terminals 35 to which the receive input of a subscriber's equipment 37 is connected. The transformer has two equal first windings 39A, 39B, a second winding 41 and a third winding 43 connected together and with a resistor 45 and a tone detection circuit 47 in corresponding manner to the transformer shown in FIG. 2.

The send output of the subscriber's equipment 37 is connected to the other pair of wires 49 of the exchange line via terminals 51, two further poles C, D of the switching arrangement 37 and terminals 53. The switching arrangement 33 operates under control of a control circuit 55 in response to the output of the tone detection circuit 47.

In normal operation the poles of the switching arrangement 33 are in the conditions shown in FIG. 3 and the exchange wires 27 and 49 are respectively connected to the receive input and send output of the subscriber's equipment, the transformer 31 being transparent to signals on wires 27 as described above in relation to FIGS. 1 and 2. The transformer 31 similarly supplies an audio tone transmitted on wires 27 to initiate line testing to the detection circuit 47 via winding 43, as described above. In response to the detection of the tone by circuit 47 the control circuit 55 operates switching arrangement 33, thereby to disconnect the subscriber's equipment 37 from both pairs of wires 27 and 49 of the line, and to connect the series connection of the winding 41 and resistor 45 between terminals 53 and hence to wires 49 of the line. The audio tone on wires 27 is then transmitted back to the exchange along wires 49 where it can be utilised to check the integrity and transmission characteristics of the line. At the end of the tone the control circuit 55 re-operates the switching arrangement 33 to re-connect the subscriber's equipment 37 to the line for normal operation. It will be appreciated that in the four wire arrangement the arrangement of transformer 31 enables the loop-back unit to operate satisfactorily despite faults in the subscriber's equipment in the same manner as the transformer in the arrangements of FIGS. 1 and 2. Moreover, a local tone generator is not required in the loop-back unit to test the line.

I claim:

1. A loop-back unit for connection at the subscriber's end of a line of a telecommunication system to provide a loop-back facility comprising: a first pair of terminals for connection to the line; a transformer having first, second and third windings, the first and second windings being connected in series, in the same sense, between said first pair of terminals and the first winding having a relatively low inductance compared with the second winding; signal detection means connected across said third winding; a second pair of terminals for connection to a subscriber's equipment; switching means whereby said second winding may be connected to or disconnected from said second pair of terminals; and control means responsive to detection of a signal by said detection means to operate said switching means to disconnect said second pair of terminals from said second winding temporarily and apply a predetermined signal to the line whilst the subscriber's equipment is so disconnected.

2. A unit according to claim 1 wherein the relation between the inductances of the first and second windings is such that, in normal operation, in response to a signal applied to said first terminals, the first and second windings produce substantially equal magnetic fluxes in the third winding in operation.

3. A unit according to claim 1 including a resistance connected in series with said second winding.

4. A unit according to claim 1 for use with a two wire line, the unit including a signal generator to generate said predetermined signal and said switching arrangement, when operated in response to detection of a signal by said detection means, also connecting said second winding to said signal generator.

5. A loop-back unit for connection at the subscriber's end of a line of a telecommunication system to provide a loop-back facility comprising: a first pair of terminals for connection to the line; a transformer having two first windings, a second winding and a third winding, the first and second windings being connected in series, in the same sense, between said first pair of terminals, the two first windings being of equal inductance, being disposed one on either side of the second winding, and together having a relatively low inductance compared with the second winding; signal detection means connected across said third winding; a second pair of terminals for connection to a subscriber's equipment; switching means whereby said second winding may be connected to or disconnected from said second pair of terminals; and control means responsive to detection of a signal by said detection means to operate said switching means to disconnect said second pair of terminals from said second winding temporarily and apply a predetermined signal to the line while the subscriber's equipment is so disconnected.

6. A unit according to claim 5 for use with a four wire line wherein said first pair of terminals are for connection to a first pair of wires of the line; said second pair of terminals are for connection to a receive input of the subscriber's equipment; the unit includes a third pair of terminals for connection to the other pair of wires of the line, and a fourth pair of terminals for connection to a send output of the subscriber's equipment, and said switching arrangement, when operated in response to detection means, also disconnects the third pair of terminals from the fourth pair of terminals and connects said second winding between said third pair of terminals, whereby a predetermined signal received on said first pair of wires of the line is applied to said second pair of wires of the line.

* * * * *